(No Model.)

F. COLE.
ANIMAL TRAP.

No. 578,391. Patented Mar. 9, 1897.

WITNESSES:

INVENTOR:
BY Fred. Cole
Alfred Meltzer
ATT'Y.

UNITED STATES PATENT OFFICE.

FRED COLE, OF KANKAKEE, ILLINOIS.

ANIMAL-TRAP.

SPECIFICATION forming part of Letters Patent No. 578,391, dated March 9, 1897.

Application filed October 12, 1896. Serial No. 608,584. (No model.)

*To all whom it may concern:*

Be it known that I, FRED COLE, a citizen of the United States, residing at Kankakee, in the county of Kankakee and State of Illinois, have invented a new and useful Improvement in Animal-Traps, of which the following is a specification.

My invention relates to animal-traps, and particularly to cage-traps. Its objects are, first, to provide improved means for springing the trap; second, to provide mechanism whereby an animal after being confined will reset the trap, and, third, to provide a construction and arrangement of the parts which will in the main be operative without the aid of springs. I attain these objects by the mechanism illustrated in the accompanying drawings, in which—

Figure 1:
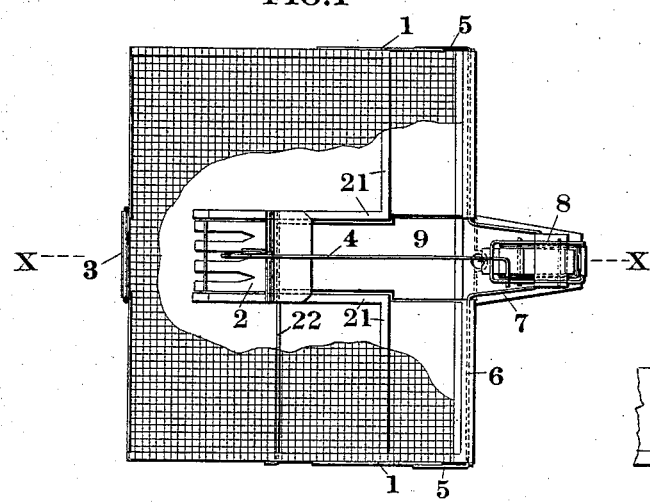
Figure 5:
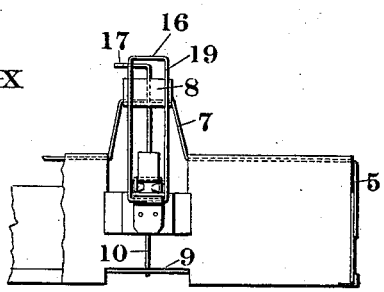
Figure 2:
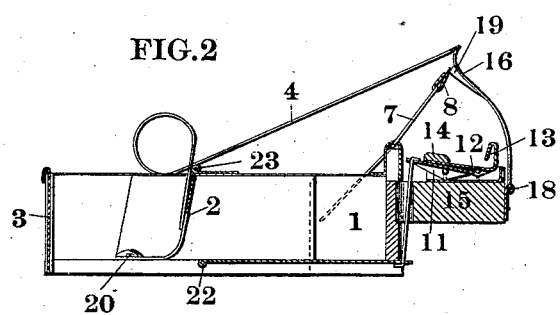
Figure 6:
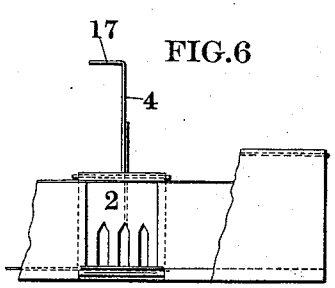
Figure 3:
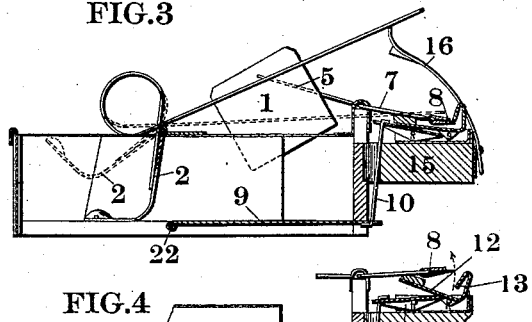
Figure 4:
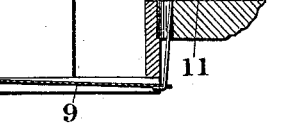

Figure 1 is a top plan of a trap constructed according to my invention, in which the parts are shown in their natural position when the trap is set, as is better illustrated in Fig. 3. Fig. 2 is a section of the same construction when all of the gates are closed, taken on the line *x x*. Fig. 3 is a section of Fig. 1, taken on the line *x x*. Fig. 4 shows the position of a portion of the locking and releasing mechanism immediately after the weight of an animal is brought to bear upon the platform 9. Fig. 5 is an elevation of the end having most of the locking mechanism, the parts being in the same position as shown in Fig. 2. Fig. 6 is an elevation of the same end having a portion broken away, so as to show the gate 2 in its normal position.

The doors 1 are secured to the arms 5, which are connected with the loop 7. The connecting member 6 is pivotally hung in the frame. The parts 5, 6, and 7 are formed of a single piece of wire in the construction shown. A tongue 8 is rigidly secured to the loop 7. A platform 9 is pivoted in the bottom of the frame at 22. The free end of the plate is connected by the arm 10 to the trigger or lever 11, which is pivotally supported on the projection 15 on the frame. The latch 12 is pivoted to the member 15 and is provided with a weighted end 14 and a latching projection 13. The member 16 is also pivoted to the projection 15 at 18. It is provided with the projection 19 on one arm, as indicated in Fig. 5.

The gate 2 has the arm 4 rigidly secured thereto.

The operation of the device is as follows: Referring to Fig. 2, it will be seen that the tongue 8 is confined by the projection 19. To set the trap, the arm 16 must be pushed slightly back, so as to release the tongue 8. The arm or loop 7 is then pressed down until the tongue 8 catches under the projection 13, as shown in Fig. 3. When an animal, entering the trap through one of the openings at gates 1, steps upon the platform 9, the lever 11 is pulled down, so that its free end raises the latch-piece 12, thus freeing the tongue 8 and permitting the gates 1 to drop back into the position shown in Fig. 2. As the gate 2 is in the form of grating, permitting the light to show through, the animal will endeavor to get out through same. The gate 2, being pivotally supported at 23, will rise when pushed against from the side toward the plate 9, thus permitting the animal to pass into the main apartment in the trap.

The gate 2 is weighted at 20 to keep same normally closed.

The trap is divided by the walls 21, so as to form the main apartment and the separate entrance-passages.

When the gate 2 is raised, the arm 4 moves down, pushing back the member 16 by means of the projection 17, so as to release the tongue 8, and carrying the tongue 8 down until same catches under the projection 13. The trap is then reset, and as the arm 7 is down the member 16 will be free to fall forward to the position shown in Fig. 2. It will now be impossible for an animal to raise the gate 2, as the arm 4 rests upon the member 16. When the trap is sprung again, so that the trap-gates 1 are closed, the arms 4 and 16 will resume the position shown in Fig. 2.

The arm 4 forms a spring-loop, so that the gate 2 can be raised to the position shown by the dotted lines in Fig. 3. This arrangement provides for animals of different sizes.

What I claim, and desire to secure by Letters Patent, is—

1. In an animal-trap, the combination of a frame therefor forming a trap-compartment; a gate depending from a pivotal support, and having an arm secured thereto adapted to engage a latch so as to hold said gate in an open position; the latch 12 adapted to engage said arm; the tilting lever 11 adapted to tip the latch so as to release said arm; a tilting platform in the compartment for actuating the lever; and an exit-gate, depending from a pivotal support and having an arm adapted to move the other arm into reëngagement with the latch when said exit-gate is opened.

2. In an animal-trap, the combination of a frame therefor forming a trap-compartment; a gate depending from a pivotal support, and having an arm 7 secured thereto; the latch 12 adapted to engage the arm 7 so as to hold said gate in an open position; the tilting lever 11; a tilting platform in the compartment for actuating the lever; the member 16 adapted to engage the arm 7 so as to lock said gate in a closed position; and an exit-gate having an arm adapted to release the arm 7 from the member 16, and to move same into reëngagement with the latch when said exit-gate is opened.

3. In an animal-trap, the combination of a frame therefor forming a trap-compartment; a gate depending from a pivotal support, and having an arm 7 secured thereto; a latch adapted to engage the arm 7 so as to hold said gate in an open position; a tilting platform in said compartment adapted to release the arm 7 from the latch; a member 16 adapted to engage the arm 7 so as to lock said gate in a closed position; and an exit-gate having an arm adapted to release the arm 7 from the member 16, and to move same into reëngagement with the latch when said exit-gate is opened.

FRED COLE.

Witnesses:
W. C. KENAGA,
A. M. URAN.